United States Patent
Sanguineti et al.

(10) Patent No.: US 11,407,896 B2
(45) Date of Patent: Aug. 9, 2022

(54) POLYMER ALLOY COMPRISING A SULPHUR-CONTAINING AROMATIC POLYMER AND A VDF-BASED POLYMER

(71) Applicant: SOLVAY SPECIALTY POLYMERS ITALY S.P.A., Bollate (IT)

(72) Inventors: Aldo Sanguineti, Milan (IT); Marco Mirenda, Rho (IT)

(73) Assignee: SOLVAY SPECIALTY POLYMERS ITALY S.P.A., Bollate (IT)

(*) Notice: Subject to any disclaimer, the term of this patent is extended or adjusted under 35 U.S.C. 154(b) by 298 days.

(21) Appl. No.: 16/607,096

(22) PCT Filed: Apr. 19, 2018

(86) PCT No.: PCT/EP2018/060003
§ 371 (c)(1),
(2) Date: Oct. 21, 2019

(87) PCT Pub. No.: WO2018/193025
PCT Pub. Date: Oct. 25, 2018

(65) Prior Publication Data
US 2020/0385575 A1      Dec. 10, 2020

(30) Foreign Application Priority Data
Apr. 21, 2017  (EP) .................... 17167519

(51) Int. Cl.
*C08L 81/02*      (2006.01)
*C08L 27/04*      (2006.01)
*C08L 27/12*      (2006.01)
*C08L 27/16*      (2006.01)
*C08L 25/18*      (2006.01)

(52) U.S. Cl.
CPC ............... *C08L 81/02* (2013.01); *C08L 25/18* (2013.01); *C08L 27/04* (2013.01); *C08L 27/12* (2013.01); *C08L 27/16* (2013.01); *C08L 2205/025* (2013.01); *C08L 2205/03* (2013.01)

(58) Field of Classification Search
CPC .............. C08L 81/02; C08L 2205/03; C08L 2205/025; C08L 2310/00; C08L 2205/22; C08L 2205/035; C08L 27/16
See application file for complete search history.

(56) References Cited

U.S. PATENT DOCUMENTS

| | | |
|---|---|---|
| 3,634,355 A | 1/1972 | Barr et al. |
| 4,008,203 A | 2/1977 | Jones |
| 4,108,837 A | 8/1978 | Johnson et al. |
| 4,175,175 A | 11/1979 | Johnson et al. |

(Continued)

FOREIGN PATENT DOCUMENTS

| | | |
|---|---|---|
| JP | 3263464 A2 | 11/1991 |
| JP | 4202472 A2 | 7/1992 |

(Continued)

*Primary Examiner* — Robert D Harlan
(74) *Attorney, Agent, or Firm* — Osha Bergman Watanabe & Burton LLP

(57) ABSTRACT

The present invention relates to a polymer alloy comprising a sulphur-containing aromatic polymer and at least one fluoropolymer, which has improved dispersibility and improved mechanical properties. The invention also relates to a process for the preparation of said polymer alloy and to an article comprising the same.

20 Claims, 9 Drawing Sheets

(56) References Cited

U.S. PATENT DOCUMENTS

| | | | |
|---|---|---|---|
| 4,395,512 A | 7/1983 | Kubota et al. | |
| 5,162,151 A | 11/1992 | Smith et al. | |
| 5,470,901 A | 11/1995 | Ishiwari et al. | |
| 2015/0184001 A1* | 7/2015 | Polastri | C09D 7/00 427/385.5 |
| 2016/0194512 A1* | 7/2016 | Bandi | C08L 27/12 428/375 |

FOREIGN PATENT DOCUMENTS

| | | |
|---|---|---|
| JP | 4372659 A2 | 12/1992 |
| JP | 5163434 A2 | 6/1993 |
| JP | 7026144 A2 | 1/1995 |
| JP | 8053592 A2 | 2/1996 |
| JP | 3133783 B2 | 2/2001 |
| JP | 3500747 B1 | 2/2001 |
| WO | 2015014699 A1 | 2/2015 |

\* cited by examiner

POLYMER ALLOY COMPRISING A SULPHUR-CONTAINING AROMATIC POLYMER AND A VDF-BASED POLYMER

CROSS-REFERENCE TO RELATED APPLICATIONS

This application is a U.S. national stage entry under 35 U.S.C. 071 of International Application No. PCT/EP2018/060003 filed Apr. 19, 2018, which claims priority to European application No. EP 17167519.2, filed on Apr. 21, 2017. The entire contents of these applications are explicitly incorporated herein by this reference.

TECHNICAL FIELD

The present invention relates to a polymer alloy comprising a sulphur-containing aromatic polymer and at least one fluoropolymer, which has improved dispersibility and improved mechanical properties.

The invention also relates to a process for the preparation of said polymer alloy and to an article comprising the same.

BACKGROUND ART

Sulphur-containing aromatic polymer such as polyarylene sulfides and polyarylsulfones are thermally stable engineering plastics consisting mainly of phenyl or biphenyl groups linked by sulfide, ether and/or sulfone groups. Those materials have excellent heat resistance and chemical resistance. However, they have poor mechanical properties, in particular impact resistance.

There has long been interest in improving the mechanical properties of sulphur-containing aromatic polymers.

Blending sulphur-containing aromatic polymers with fluorine-containing polymers can produce novel materials combining the performances and properties of both classes. However, they are highly incompatible and difficult to compound.

It has been already proposed to mix certain polyphenylene sulfide with an inorganic filler and a fluorine containing rubber such as a copolymer of vinylidene fluoride and hexafluoropropylene or the terpolimer vinylidene fluoride-hexafluoropropylene-tetrafluoroethylene. Such blends are disclosed, for instance, in U.S. Pat. No. 4,395,512 (SHIN-ETSU CHEMICAL CO., LTD.). In this document it is stated that said blends show improved impact resistance in comparison with polyphenylene sulfide.

Blends of sulphur-containing aromatic polymers with fluorine-containing polymers tend however to have morphology with large regions or domains of the individual polymers rather than fine, well-dispersed domains. The large domains tend to produce a material with poor mechanical properties, e.g. injection molded parts having poor tensile properties.

The interfaces between these domains also have a poor strength, which in turn generate overall low mechanical properties of the blend.

To improve the dispersibility of the blend, a compatibilizer can be added.

JP3133783 (TONEN KAGAKU KK., TONEN SEKIYU-KAGAKU KK.)

discloses in this regard that a copolymer of an α-olefin with a glycidyl ester of α-β-unsaturated fatty acid can be used to improve the compatibility of a polyarylene sulfide with polyvinylfluoride.

JP3500747 (DAINIPPON INK AND CHEMICALS) discloses an improved thermoplastic resin prepared by compounding a polyarylene sulfide resin with a copolymer of tetrafluoroethylene, vinylidene fluoride and chlorotrifluoroethylene by adding a silane compound as compatibilizer.

However, U.S. Pat. No. 5,470,901 (DAIKIN IND LTD) discloses that no suitable compatibilizer exists for improving the dispersibility of a fluorine-containing elastomer in polyphenylene sulfide having the required chemical and heat resistance properties.

There is still hence a shortfall in the art for blends comprising fluorine-containing polymers finely dispersed into sulphur-containing aromatic polymers which combine the advantageous performances of both ingredients, notably the chemical and heat resistance of sulphur-containing aromatic polymers and the mechanical properties of fluorine-containing polymers.

SUMMARY OF INVENTION

The Applicant has surprisingly found that certain copolymers of vinylidene fluoride (VDF) and chlorotrifluoroethylene (CTFE) can be blended with sulphur-containing aromatic polymers to produce alloys wherein said copolymers are uniformly dispersed in the sulphur-containing aromatic polymers, the polymer alloy being characterized by having improved mechanical properties.

It is thus the first object of the present invention to provide a polymer alloy (PA) comprising:
   a sulphur-containing aromatic polymer [aromatic polymer (A)]; and
   a copolymer [copolymer (C)] comprising:
      i) recurring units derived from vinylidene fluoride (VDF); and
      ii) from 0.5 to 20% by moles of recurring units derived from chlorotrifluoroethylene (CTFE), with respect to the total moles of recurring units of copolymer (C).

Another object of the present invention is to provide a process for preparing said polymer alloy.

The same copolymers (C) are also effective in improving the compatibilization of other fluoropolymers with sulphur-containing aromatic polymers.

A second object of the present invention is thus to provide a polymer alloy (PA) which further comprises:
   at least one fluoropolymer (F), different from copolymer (C).

In a further object, the present invention is directed to articles made of said polymer alloy.

DESCRIPTION OF EMBODIMENTS

Aromatic Polymer (A)

Figure 1:
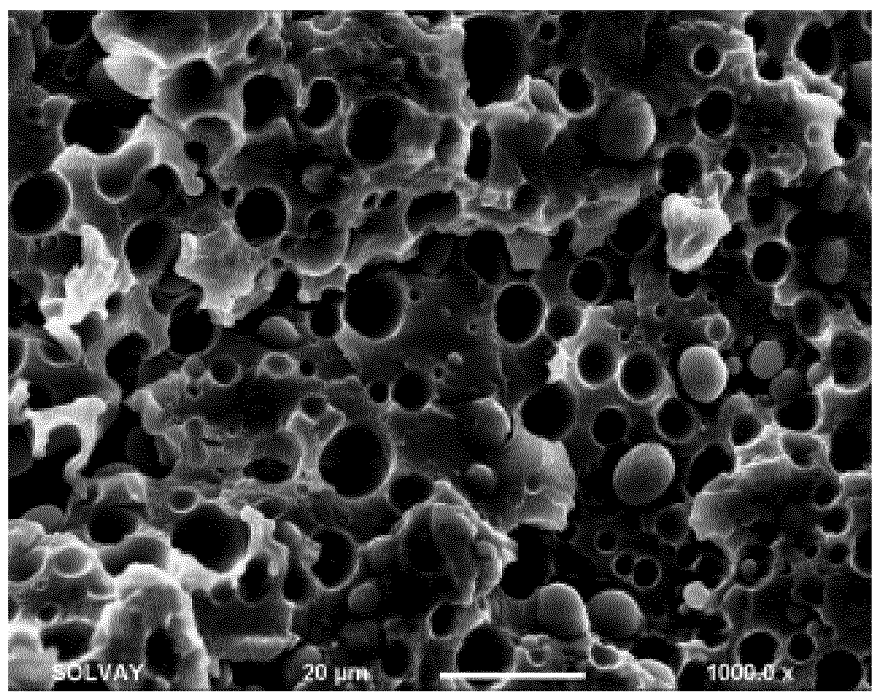
FIG. 1 shows the SEM image of the blend of Comparative Example 1 at a magnification of 1000.0×.

Aromatic polymer (A) to be used in the present invention may be a poly(arylene sulfide) (PAS) or an aromatic sulfone polymer (SP).

PASs are polymers comprising the repeating unit of the formula —(Ar—S)— as the main structural unit, preferably containing the repeating unit in an amount of 80 mol % or more. Ar represents an aromatic group, and examples include units (RU1) represented by the formulas (I) to (XI) given below, among which the formula (I) is particularly preferred:

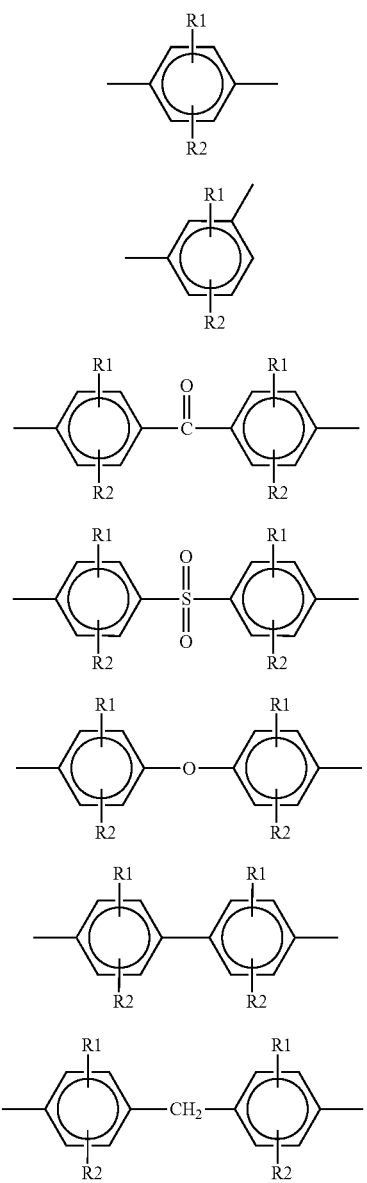

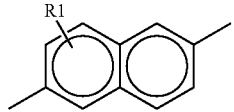

wherein R1 and R2 each represent a substituent selected from hydrogen, alkyl of 1 to 12 carbon atoms, alkoxy of 1 to 12 carbon atoms, arylene of 6 to 24 carbon atoms, and halogen, and R1 and R2 may be the same or different.

Accordingly, poly(arylene sulfide) (PAS) is preferably polyphenylene sulfide (PPS).

For the purposes of the present invention, the definition "aromatic sulfone polymer (SP)" is intended to denote any polymer of which more than 50 wt %, preferably more than 70 wt %, more preferably more than 90 wt %, of recurring units (RU2) comprise at least one group of formula (XII):

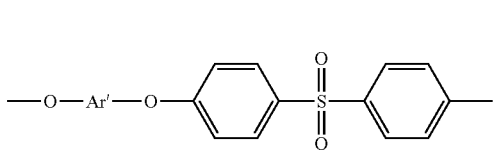

Ar' being a group chosen among the following structures:

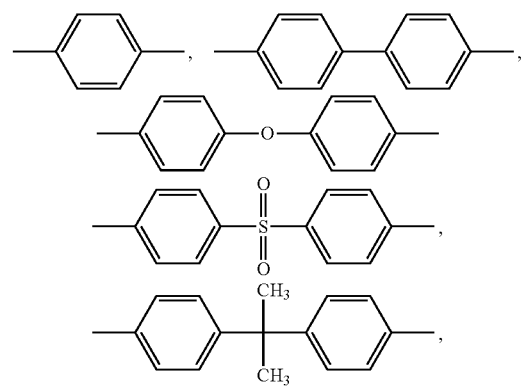

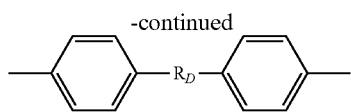

with $R_D$ being:

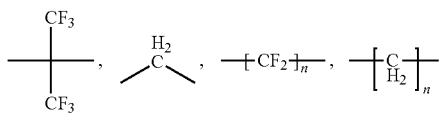

with n=integer from 1 to 6.

The recurring units (RU2) are preferably chosen from:

(XIII)

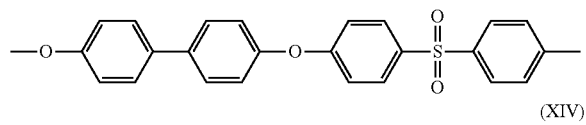

(XIV)

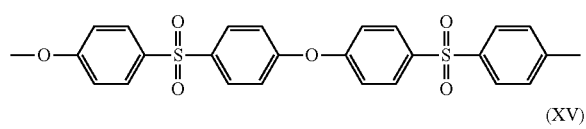

(XV)

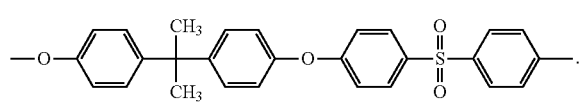

Accordingly, aromatic sulfone polymer (SP) is preferably chosen among the group consisting of polysulfone (PSU), polyphenylsulfone (PPSU), polyethersulfone (PESU), copolymers and mixtures thereof and is most preferably a polysulfone (PSU) or polyphenylsulfone (PPSU).

Polysulfone is notably available as UDEL® PSU from Solvay Specialty Polymers USA, L.L.C.

Polysulfone is made by condensing bisphenol A and 4,4'-dichlorodiphenyl sulfone.

Polyphenylsulfone is notably available as RADEL® R from Solvay Specialty Polymers USA, L.L.C and is made by reacting units of 4,4'-dichlorodiphenyl sulfone and 4,4'-biphenol.

Methods well known in the art for the preparation of polyphenylsulfone are for instance those described in documents U.S. Pat. Nos. 3,634,355; 4,008,203; 4,108,837 and 4,175,175, the whole content of which is incorporated herein by reference.

Copolymer (C)

Copolymer (C) to be used in the present invention is a polymer comprising recurring units derived from vinylidene fluoride (VDF) and recurring units derived from chlorotrifluoroethylene (CTFE), wherein the recurring units derived from CTFE are present in an amount comprised between 0.5 to 20% by moles, preferably from 1 to 15% by moles, more preferably from 7 to 12% by moles, with respect to the total moles of recurring units of copolymer (C).

Recurring units of at least another fluorinated monomer (FM) different from vinylidene fluoride and from chlorotrifluoroethylene may be included in copolymer (C).

By the term "fluorinated monomer (FM)" it is hereby intended to denote an ethylenically unsaturated monomer comprising at least one fluorine atom.

In the rest of the text, the expression "fluorinated monomers" is understood, for the purposes of the present invention, both in the plural and the singular, that is to say that they denote both one or more than one fluorinated monomers as defined above.

Should the fluorinated monomer (FM) comprise at least one hydrogen atom, it is designated as hydrogen-containing fluorinated monomer.

Should the fluorinated monomer (FM) be free of hydrogen atoms, it is designated as per(halo)fluorinated monomer.

The fluorinated monomer (FM) may further comprise one or more other halogen atoms (Cl, Br, I).

Non-limiting examples of suitable fluorinated monomers (FM) include, notably, the followings:

$C_2$-$C_8$ perfluoroolefins such as tetrafluoroethylene (TFE) and hexafluoropropylene (HFP);

$C_2$-$C_8$ hydrogenated fluoroolefins such as vinyl fluoride (VF1), 1,2-difluoroethylene and trifluoroethylene (VF3);

perfluoroalkylethylenes of formula $CH_2=CH-R_{f0}$ wherein $R_{f0}$ is a $C_1$-$C_6$ perfluoroalkyl;

chloro- and/or bromo- and/or iodo-$C_2$-$C_6$ fluoroolefins;

(per)fluoroalkylvinylethers of formula $CF_2=CFOR_{f1}$ wherein $R_{f1}$ is a $C_1$-$C_6$ fluoro- or perfluoroalkyl, e.g. $CF_3$, $C_2F_5$, $C_3F_7$;

$CF_2=CFOX_0$ (per)fluoro-oxyalkylvinylethers wherein $X_0$ is a $C_1$-$C_{12}$ alkyl group, a $C_1$-$C_{12}$ oxyalkyl group or a $C_1$-$C_{12}$ (per)fluorooxyalkyl group having one or more ether groups, such as perfluoro-2-propoxy-propyl group;

(per)fluoroalkylvinylethers of formula $CF_2=CFOCF_2OR_{f2}$ wherein $R_{f2}$ is a $C_1$-$C_6$ fluoro- or perfluoroalkyl group, e.g. $CF_3$, $C_2F_5$, $C_3F_7$ or a $C_1$-$C_6$ (per)fluorooxyalkyl group having one or more ether groups such as $-C_2F_5-O-CF_3$;

functional (per)fluoro-oxyalkylvinylethers of formula $CF_2=CFOY_0$ wherein $Y_0$ is a $C_1$-$C_{12}$ alkyl group or (per)fluoroalkyl group, a $C_1$-$C_{12}$ oxyalkyl group or a $C_1$-$C_{12}$ (per)fluorooxyalkyl group having one or more ether groups and $Y_0$ comprising a carboxylic or sulfonic acid group, in its acid, acid halide or salt form;

fluorodioxoles, preferably perfluorodioxoles.

The fluorinated monomer (FM) is preferably hexafluoropropylene (HFP).

The amount of fluorinated monomer (FM) in copolymer (C) is preferably of at least 2.5% by moles, preferably at least 4.0% by moles, even more preferably at least 6.0% by moles with respect to the total moles of recurring units of copolymer (C).

In a preferred embodiment, the copolymer (C) of the present invention comprises recurring units derived:

from VDF in an amount from 50 to 90% by moles with respect to the total moles of recurring units of copolymer (C);

from CTFE in an amount from 0.5 to 20% by moles with respect to the total moles of recurring units of copolymer (C); and from at least one fluorinated monomer (FM) in an amount from 10 to 30% by moles with respect to the total moles of recurring units of copolymer (C).

Melt flow rate of the copolymers (C), measured following the procedure of ASTM D1238, ranges generally from 1 to 50 g/10 min.

The copolymer (C) may be prepared by any polymerization process known in the art.

The Applicant has surprisingly found that copolymer (C) can be used in the preparation of polymer alloys comprising a sulphur-containing aromatic polymers and fluorine-containing polymers in all proportions by weight, wherein the components of the alloys are uniformly dispersed.

It has in fact been observed that after melt mixing a blend of copolymer (C) and a sulphur-containing aromatic polymer at a temperature which is above the temperature where all the components are in the molten form, a plurality of discrete domains dispersed within a continuous phase is formed, wherein the dimension of the particle size of said discrete domains is markedly decreased in comparison with the blend not submitted to melt mixing.

The average particle size of the discrete domains in the polymer alloy of the present invention is conveniently less than 2 microns, preferably less than 1 micron, more preferably less than 0.5 microns.

The polymer alloy (PA) according to the present invention may comprise:
from 1 to 99% by weight of aromatic polymer (A);
from 1 to 99% by weight of copolymer (C),
all the aforementioned percentages by weight being referred to the total weight of polymer alloy (PA).

In one aspect, the present invention provides a polymer alloy comprising a continuous phase of a sulphur-containing aromatic polymer [aromatic polymer (A)] and discrete domains of a copolymer [copolymer (C)].

In a preferred embodiment according to this first aspect, the present invention provides a polymer alloy (PA) which comprises:
from 60 to 90%, preferably from 70 to 85%, by weight of aromatic polymer (A); and
from 10 to 40%, preferably from 20 to 30%, more preferably from 15 to 25% by weight of copolymer (C),
all the aforementioned percentages by weight being referred to the total weight of polymer alloy (PA).

In a second aspect, the present invention provides a polymer alloy comprising a continuous phase of a copolymer [copolymer (C)] and discrete domains of a sulphur-containing aromatic polymer [aromatic polymer (A)].

In a preferred embodiment according to this second aspect, the present invention provides a polymer alloy (PA) which comprises:
from 10 to 40%, preferably from 15 to 25% by weight of aromatic polymer (A);
from 60 to 90%, preferably from 75 to 85% by weight of copolymer (C),
all the aforementioned percentages by weight being referred to the total weight of polymer alloy (PA).

The Applicant has also surprisingly found that the use of a copolymer (C) can also be used to significantly improve the dispersibility of other fluoropolymers, different from copolymer (C), in sulphur-containing aromatic polymers, thus allowing the preparation of polymer alloys comprising a sulphur-containing aromatic polymer and a fluoropolymer in all proportion by weight, wherein all the components in the polymer alloy are uniformly dispersed.

Mixing a blend of a fluoropolymer and a sulphur-containing aromatic polymer in the presence of certain amounts of copolymer (C) at a temperature which is above the temperature where all the components are in the molten form results in fact in a uniformly dispersed alloy wherein dispersed domains of reduced average particle size are dispersed within a continuous phase.

Without wishing to be bound to any theory, it is believed that melt mixing a sulphur-containing aromatic polymer with a copolymer (C) gives a chemically linked fluorinated-aromatic moiety which acts as an in-situ-generated compatibilizer.

A second object of the present invention thus provides a polymer alloy (PA) comprising:
a sulphur-containing aromatic polymer [aromatic polymer (A)];
a copolymer [copolymer (C)] comprising recurring units derived from vinylidene fluoride (VDF) and from 0.5 to 20%, preferably from 1 to 15% by mole, more preferably from 7 to 12% by moles, of recurring units derived from chlorotrifluoroethylene (CTFE), with respect to the total moles of recurring units of copolymer (C); and
at least one fluoropolymer (F), different from copolymer (C).

Fluoropolymer (F)

The expression "fluoropolymer (F)" is used, within the frame of the present invention for designating polymers comprising recurring units derived from fluorinated monomer(s).

In a first variant, fluoropolymer (F) may be selected among polyaddition polymers comprising recurring units derived from ethylenically unsaturated monomers comprising fluorine atom(s), which are generally selected from the group consisting of:

(a) $C_2$-$C_8$ perfluoroolefins such as tetrafluoroethylene (TFE), hexafluoropropylene (HFP), perfluoroisobutylene;

(b) hydrogen-containing $C_2$-$C_8$ fluoroolefins such as vinylidene fluoride (VDF), vinyl fluoride (VF), trifluoroethylene (VF3), hexafluoroisobutylene (HFIB), perfluoroalkyl ethylenes of formula $CH_2=CH-R_{f1}$, wherein $R_{f1}$ is a $C_1$-$C_6$ perfluoroalkyl group;

(c) $C_2$-$C_8$ chloro- and/or bromo-containing fluoroolefins such as chlorotrifluoroethylene (CTFE);

(d) perfluoroalkylvinylethers (PAVE) of formula $CF_2=CFOR_{f1}$, wherein $R_{f1}$ is a $C_1$-$C_6$ perfluoroalkyl group, such as $CF_3$ (PMVE), $C_2F_5$ or $C_3F_7$;

(e) perfluorooxyalkylvinylethers of formula $CF_2=CFOX_0$, wherein $X_0$ is a a $C_1$-$C_{12}$ perfluorooxyalkyl group comprising one or more than one ethereal oxygen atom, including notably perfluoromethoxyalkylvinylethers of formula $CF_2=CFOCF_2OR_{f2}$, with $R_{f2}$ being a $C_1$-$C_3$ perfluoro(oxy)alkyl group, such as $-CF_2CF_3$, $-CF_2CF_2-O-CF_3$ and $-CF_3$; and (f) (per)fluorodioxoles of formula:

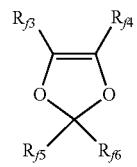

wherein each of $R_{f3}$, $R_{f4}$, $R_{f5}$ and $R_{f6}$, equal to or different from each other, is independently a fluorine atom, a $C_1$-$C_6$ perfluoro(oxy)alkyl group, optionally comprising one or more oxygen atoms, such as $-CF_3$, $-C_2F_5$, $-C_3F_7$, $-OCF_3$ or $-OCF_2CF_2OCF_3$.

Fluoropolymer (F) is preferably a vinylidene fluoride polymer [polymer (VDF)].

The expression "vinylidene fluoride polymer" is used within the frame of the present invention for designating polymers essentially made of recurring units, more that 50% by moles of said recurring units being derived from vinylidene fluoride (VDF).

The polymer (VDF) is preferably a polymer comprising:

(a') at least 50% by moles, preferably at least 70% by moles, more preferably 75% by moles of recurring units derived from vinylidene fluoride (VDF);

(b') optionally from 0.1 to 50%, preferably from 1 to 25% by moles of recurring units derived from at least one fluorinated monomer (FM2) different from VDF; and (c') optionally from 0.1 to 5%, by moles, preferably 0.1 to 3% by moles, more preferably 0.1 to 1% by moles of recurring units derived from one or more hydrogenated comonomer(s), all the aforementioned percentages by moles being referred to the total moles of recurring units of the polymer (VDF).

The fluorinated monomer (FM) suitable for the polymer alloy (PA) according to this second object is advantageously selected from the group consisting of vinyl fluoride (VF$_1$); trifluoroethylene (VF$_3$); chlorotrifluoroethylene (CTFE); 1,2-difluoroethylene; tetrafluoroethylene (TFE); hexafluoropropylene (HFP); perfluoro(alkyl)vinyl ethers, such as perfluoro(methyl)vinyl ether (PMVE), perfluoro(ethyl) vinyl ether (PEVE) and perfluoro(propyl)vinyl ether (PPVE); perfluoro(1,3-dioxole); perfluoro(2,2-dimethyl-1,3-dioxole) (PDD).

Preferably, the fluorinated monomer (FM) is chosen from chlorotrifluoroethylene (CTFE), hexafluoroproylene (HFP), trifluoroethylene (VF3) and tetrafluoroethylene (TFE).

The choice of the said hydrogenated comonomer(s) is not particularly limited; alpha-olefins, (meth)acrylic monomers, vinyl ether monomers, styrenic mononomers may be used; nevertheless, to the sake of optimizing chemical resistance, embodiment's wherein the fluoropolymer (F) is essentially free from recurring units derived from said hydrogenated comonomer(s) are preferred.

Accordingly, the vinylidene fluoride polymer [polymer (VDF)] is more preferably a polymer consisting essentially of:

(a') at least 50% by moles, preferably at least 70% by moles, more preferably 75% by moles of recurring units derived from vinylidene fluoride (VDF);

(b') optionally from 0.1 to 50%, preferably from 1 to 25 by moles of at least one fluorinated monomer (FM2) different from VDF; said fluorinated monomer (FM) being preferably selected in the group consisting of vinylfluoride (VF$_1$), chlorotrifluoroethylene (CTFE), hexafluoropropene (HFP), tetrafluoroethylene (TFE), perfluoromethylvinylether (PMVE), trifluoroethylene (VF3) and mixtures therefrom, all the aforementioned % by moles being referred to the total moles of recurring units of the polymer (VDF).

Defects, end chains, impurities, chains inversions or branchings and the like may be additionally present in the polymer (VDF) in addition to the said recurring units, without these components substantially modifying the behaviour and properties of the fluoropolymer (F).

As non-limitative examples of fluoropolymers (F) useful in the present invention, mention can be notably made of the following polymer (VDF): homopolymers of VDF, VDF/TFE copolymers, VDF/TFE/HFP terpolymers, VDF/TFE/CTFE terpolymers, VDF/TFE/TrFE terpolymers, VDF/HFP copolymers, VDF/TFE/HFP/CTFE polymers and the like.

Homopolymers of VDF are particularly advantageous for being used as fluoropolymer (F) in the polymer alloy (PA) according to this first variant.

The melt index of the polymer (VDF) is advantageously at least 0.01, preferably at least 0.05, more preferably at least 0.1 g/10 min and advantageously less than 50, preferably less than 30, more preferably less than 20 g/10 min, when measured in accordance with ASTM test No. 1238, run at 230° C., under a piston load of 2.16 kg.

The melt index of the polymer (VDF) is advantageously at least 1, preferably at least 2, more preferably at least 5 g/10 min and advantageously less than 70, preferably less than 50, more preferably less than 40 g/10 min, when measured in accordance with ASTM test No. 1238, run at 230° C., under a piston load of 5 kg.

The polymer (VDF) has advantageously a melting point (T$_{m2}$) advantageously of at least 120° C., preferably at least 125° C., more preferably at least 130° C. and of at most 190° C., preferably at most 185° C., more preferably at most 180° C., when determined by DSC, at a heating rate of 10° C./min, according to ASTM D 3418.

In a second variant, fluoropolymer (F) may be selected among thermoplastic elastomers [polymer (F-TPE)] comprising:

(i) at least one elastomeric block (A) consisting of a sequence of recurring units, said sequence comprising recurring units derived from at least one fluorinated monomer, said block (A) possessing a glass transition temperature of less than 25° C., as determined according to ASTM D3418, (ii) at least one thermoplastic block (B) consisting of a sequence of recurring units, said sequence comprising recurring units derived from at least one fluorinated monomer, wherein the crystallinity of said block (B) and its weight fraction in the polymer (F-TPE) are such to provide for a heat of fusion (ΔH$_f$) of the polymer (F-TPE) of at most 20 J/g, when determined according to ASTM D3418.

For the purpose of the present invention, the term "elastomeric", when used in connection with the "block (A)" is hereby intended to denote a polymer chain segment which, when taken alone, is substantially amorphous, that is to say, has a heat of fusion of less than 2.0 J/g, preferably of less than 1.5 J/g, more preferably of less than 1.0 J/g, as measured according to ASTM D3418.

For the purpose of the present invention, the term "thermoplastic", when used in connection with the "block (B)", is hereby intended to denote a polymer chain segment which, when taken alone, is semi-crystalline, and possesses a detectable melting point, with an associated heat of fusion of exceeding 10.0 J/g, as measured according to ASTM D3418.

The polymer (F-TPE) of the invention is advantageously a block copolymer, said block copolymer typically having a structure comprising at least one block (A) alternated to at least one block (B), that is to say that said fluorinated thermoplastic elastomer typically comprises, preferably consists of, one or more repeating structures of type (B)-(A)-(B). Generally, the polymer (F-TPE) has a structure of type (B)-(A)-(B), i.e. comprising a central block (A) having two ends, connected at both ends to a side block (B).

The block (A) is often alternatively referred to as soft block (A); the block (B) is often alternatively referred to as hard block (B).

Any of block(s) (A) and (B) is fluorinated, that is to say it comprises recurring units derived from at least one fluorinated monomer as above defined.

Any of block(s) (A) and (B) may further comprise recurring units derived from at least one hydrogenated monomer, wherein the term "hydrogenated monomer" is intended to denote an ethylenically unsaturated monomer comprising at least one hydrogen atom and free from fluorine atoms.

The elastomeric block (A) may further comprise recurring units derived from at least one bis-olefin [bis-olefin (OF)] of formula:

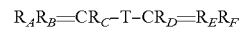

wherein $R_A$, $R_B$, $R_C$, $R_D$, $R_E$ and $R_F$, equal to or different from each other, are selected from the group consisting of H, F, Cl, $C_1$-$C_5$ alkyl groups and $C_1$-$C_5$ (per)fluoroalkyl groups, and T is a linear or branched $C_1$-$C_{18}$ alkylene or cycloalkylene group, optionally comprising one or more than one ethereal oxygen atom, preferably at least partially fluorinated, or a (per)fluoropolyoxyalkylene group.

The bis-olefin (OF) is preferably selected from the group consisting of those of any of formulae (OF-1), (OF-2) and (OF-3):

(OF-1)

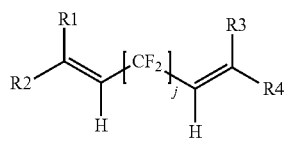

wherein j is an integer comprised between 2 and 10, preferably between 4 and 8, and R1, R2, R3 and R4, equal to or different from each other, are selected from the group consisting of H, F, $C_1$-$C_5$ alkyl groups and $C_1$-$C_5$ (per)fluoroalkyl groups;

(OF-2)

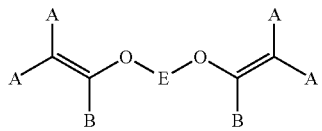

wherein each of A, equal to or different from each other and at each occurrence, is independently selected from the group consisting of H, F and Cl; each of B, equal to or different from each other and at each occurrence, is independently selected from the group consisting of H, F, Cl and $OR_B$, wherein $R_B$ is a branched or straight chain alkyl group which may be partially, substantially or completely fluorinated or chlorinated, E is a divalent group having 2 to 10 carbon atoms, optionally fluorinated, which may be inserted with ether linkages; preferably E is a —$(CF_2)_m$— group, wherein m is an integer comprised between 3 and 5; a preferred bis-olefin of (OF-2) type is $F_2C=CF$—O—$(CF_2)_5$—O—$CF=CF_2$;

(OF-3)

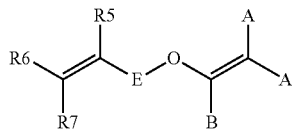

wherein E, A and B have the same meaning as defined above, R5, R6 and R7, equal to or different from each other, are selected from the group consisting of H, F, $C_1$-$C_5$ alkyl groups and $C_1$-$C_5$ (per)fluoroalkyl groups.

Should the block (A) consist of a recurring units sequence further comprising recurring units derived from at least one bis-olefin (OF), said sequence typically comprises recurring units derived from the said at least one bis-olefin (OF) in an amount comprised between 0.01% and 1.0% by moles, preferably between 0.03% and 0.5% by moles, more preferably between 0.05% and 0.2% by moles, based on the total moles of recurring units of block (A).

The polymer (F-TPE) preferably consists of:

at least one elastomeric block (A) selected from the group consisting of:

(1) vinylidene fluoride (VDF)-based elastomeric blocks ($A_{VDF}$) consisting of a sequence of recurring units, said sequence comprising recurring units derived from VDF and recurring units derived from at least one fluorinated monomer different from VDF, said fluorinated monomer different from VDF being typically selected from the group consisting of:

(a) $C_2$-$C_8$ perfluoroolefins such as tetrafluoroethylene (TFE), hexafluoropropylene (HFP);

(b) hydrogen-containing $C_2$-$C_8$ fluoroolefins different from VDF, such as vinyl fluoride, trifluoroethylene (VF3), hexafluoroisobutylene (HFIB), perfluoroalkyl ethylenes of formula $CH_2=CH$—$R_{f1}$, wherein $R_{f1}$ is a $C_1$-$C_6$ perfluoroalkyl group;

(c) $C_2$-$C_8$ chloro- and/or bromo-containing fluoroolefins such as chlorotrifluoroethylene (CTFE);

(d) perfluoroalkylvinylethers (PAVE) of formula $CF_2=CFOR_{f1}$, wherein $R_{f1}$ is a $C_1$-$C_6$ perfluoroalkyl group, such as $CF_3$ (PMVE), $C_2F_5$ or $C_3F_7$;

(e) perfluorooxyalkylvinylethers of formula $CF_2=CFOX_0$, wherein $X_0$ is a a $C_1$-$C_{12}$ perfluorooxyalkyl group comprising one or more than one ethereal oxygen atom, including notably perfluoromethoxyalkylvinylethers of formula $CF_2=CFOCF_2OR_{f2}$, with $R_{f2}$ being a $C_1$-$C_3$ perfluoro(oxy)alkyl group, such as —$CF_2CF_3$, —$CF_2CF_2$—O—$CF_3$ and —$CF_3$; and (f) (per)fluorodioxoles of formula:

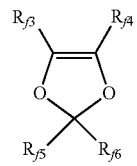

wherein each of $R_{f3}$, $R_{f4}$, $R_{f5}$ and $R_{f6}$, equal to or different from each other, is independently a fluorine atom, a $C_1$-$C_6$ perfluoro(oxy)alkyl group, optionally comprising one or more oxygen atoms, such as —$CF_3$, —$C_2F_5$, —$C_3F_7$, —$OCF_3$ or —$OCF_2CF_2OCF_3$; and (2) tetrafluoroethylene (TFE)-based elastomeric blocks ($A_{TFE}$) consisting of a sequence of recurring units, said sequence comprising recurring units derived from TFE and recurring units derived from at least one fluorinated monomer different from TFE, said fluorinated monomer being typically selected from the group consisting of those of classes (b), (c), (d), (e) as defined above;

at least one thermoplastic block (B) consisting of a sequence of recurring, said sequence comprising recurring units derived from at least one fluorinated monomer.

Any of block(s) ($A_{VDF}$) and ($A_{TFE}$) may further comprise recurring units derived from at least one hydrogenated monomer, which may be selected from the group consisting of $C_2$-$C_8$ non-fluorinated olefins such as ethylene, propylene or isobutylene, and may further comprise recurring units derived from at least one bis-olefin (OF), as above detailed.

The elastomeric block (A) is preferably a block ($A_{VDF}$), as above detailed, said block ($A_{VDF}$) typically consisting of a sequence of recurring units comprising, preferably consisting of:
- from 45% to 80% by moles of recurring units derived from vinylidene fluoride (VDF),
- from 5% to 50% by moles of recurring units derived from at least one fluorinated monomer different from VDF,
- optionally, up to 1.0% by moles of recurring units derived from at least one bis-olefin (OF), as above detailed; and
- optionally, up to 30% by moles of recurring units derived from at least one hydrogenated monomer, with respect to the total moles of recurring units of the sequence of block ($A_{VDF}$).

Block (B) may consist of a sequence of recurring units, said sequence comprising:
recurring units derived from one or more than one fluoromonomer, preferably selected from the group consisting of:
(a) $C_2$-$C_8$ perfluoroolefins such as tetrafluoroethylene (TFE), hexafluoropropylene (HFP);
(b) hydrogen-containing $C_2$-$C_8$ fluoroolefins, such as vinylidene fluoride (VDF), vinyl fluoride, trifluoroethylene (VF3), hexafluoroisobutylene (HFIB), perfluoroalkyl ethylenes of formula $CH_2=CH-R_{f1}$, wherein $R_{f1}$ is a $C_1$-$C_6$ perfluoroalkyl group;
(c) $C_2$-$C_8$ chloro- and/or bromo-containing fluoroolefins such as chlorotrifluoroethylene (CTFE);
(d) perfluoroalkylvinylethers (PAVE) of formula $CF_2=CFOR_{f1}$, wherein $R_{f1}$ is a $C_1$-$C_6$ perfluoroalkyl group, such as $CF_3$ (PMVE), $C_2F_5$ or $C_3F_7$;
(e) perfluorooxyalkylvinylethers of formula $CF_2=CFOX_0$, wherein $X_0$ is a a $C_1$-$C_{12}$ perfluorooxyalkyl group comprising one or more than one ethereal oxygen atom, including notably perfluoromethoxyalkylvinylethers of formula $CF_2=CFOCF_2OR_{f2}$, with $R_{f2}$ being a $C_1$-$C_3$ perfluoro(oxy)alkyl group, such as $-CF_2CF_3$, $-CF_2CF_2-O-CF_3$ and $-CF_3$; and
(f) (per)fluorodioxoles of formula:

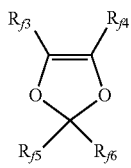

wherein each of $R_{f3}$, $R_{f4}$, $R_{f5}$ and $R_{f6}$, equal to or different from each other, is independently a fluorine atom, a $C_1$-$C_6$ perfluoro(oxy)alkyl group, optionally comprising one or more oxygen atoms, such as $-CF_3$, $-C_2F_5$, $-C_3F_7$, $-OCF_3$ or $-OCF_2CF_2OCF_3$; and optionally, recurring units derived from one or more than one hydrogenated monomer, as above detailed, including notably ethylene, propylene, (meth)acrylic monomers, styrenic monomers.

More specifically, block (B) may be selected from the group consisting of:
blocks ($B_{VDF}$) consisting of a sequence of recurring units derived from vinylidene fluoride and optionally from one or more than one additional fluorinated monomer different from VDF, e.g. HFP, TFE or CTFE, and optionally from a hydrogenated monomer, as above detailed, e.g. a (meth)acrylic monomer, whereas the amount of recurring units derived from VDF is of 85 to 100% moles, based on the total moles of recurring units of block ($B_{VDF}$);

blocks ($B_{TFE}$) consisting of a sequence of recurring units derived from tetrafluoroethylene, and optionally from an additional perfluorinated monomer different from TFE, whereas the amount of recurring units derived from TFE is of 75 to 100% moles, based on the total moles of recurring units of block (B);

blocks ($B_{E/(C)TFE}$) consisting of a sequence of recurring units derived from ethylene and recurring units derived from CTFE and/or TFE, possibly in combination with an additional monomer.

The weight ratio between blocks (A) and blocks (B) in the fluorinated thermoplastic elastomer is typically comprised between 95:5 and 10:90.

According to certain preferred embodiments, the polymers (F-TPE) comprise a major amount of blocks (A); according to these embodiment's, the polymer (F-TPE) used in the method of the present invention is characterized by a weight ratio between blocks (A) and blocks (B) of 95:5 to 65:35, preferably 90:10 to 70:30.

The crystallinity of block (B) and its weight fraction in the polymer (F-TPE) are such to provide for a heat of fusion ($\Delta H_f$) of the polymer (F-TPE) of at most 20 J/g, preferably at most 18 J/g, more preferably at most 15 J/g, when determined according to ASTM D3418; on the other side, polymer (F-TPE) combines thermoplastic and elastomeric character, so as to possess a certain crystallinity, delivering a heat of fusion of at least 2.5 J/g, preferably at least 3.0 J/g.

Preferred polymers (F-TPE) are those comprising:
- at least one elastomeric block ($A_{VDF}$), as above detailed, and
- at least one thermoplastic block ($B_{VDF}$), as above detailed, and wherein the crystallinity of said block (B) and its weight fraction in the polymer (F-TPE) are such to provide for a heat of fusion of the polymer (F-TPE) of at most 15 J/g, when determined according to ASTM D3418.

More than one fluoropolymer (F) can be present in the polymer alloy according to the second object of the present invention. Thus, for example, the fluoropolymer (F) component in the polymer alloy can be a blend of two or more fluoropolymers (F) or a compound of two or more fluoropolymers (F) further including suitable additives.

The copolymer (C) in the polymer alloy according to this second object can be present in an amount comprised between 0.1 to 20% by weight, preferably from 1 to 5% by weight, with respect to the total weight of the polymer alloy.

Thus, according to this second object it is provided a polymer alloy (PA) comprising:
- from 1 to 98.9% by weight of aromatic polymer (A);
- from 0.1 to 20% by weight of copolymer (C); and
- from 1 to 98.9% by weight of at least one fluoropolymer (F), all the aforementioned percentages by weight being referred to the total weight of polymer alloy (PA).

In one aspect of this second object, the present invention provides a polymer alloy comprising a continuous phase of a sulphur-containing aromatic polymer [aromatic polymer (A)] and discrete domains of a fluoropolymer (F) and of a copolymer (C).

In a preferred embodiment according to this aspect, the polymer alloy (PA) comprises:
- from 60 to 90%, preferably from 70 to 80%, by weight of aromatic polymer (A);
- from 0.1 to 20%, preferably from 1 to 5% by weight of copolymer (C); and from 9 to 39%, preferably from 20 to 35%, more preferably from 15 to 30% by weight of at least one fluoropolymer (F), all the aforementioned percentages by weight being referred to the total weight of polymer alloy (PA).

In a second aspect of this second object, the present invention provides a polymer alloy comprising a co-continuous phase of a fluoropolymer (F) and of a copolymer (C) and discrete domains of a sulphur-containing aromatic polymer [aromatic polymer (A)].

In a preferred embodiment according to this aspect, the polymer alloy (PA) comprises:

from 10 to 40%, preferably from 15 to 25% by weight of aromatic polymer (A);
from 0.1 to 20%, preferably from 1 to 5% by weight of copolymer (C); and
from 59 to 89%, preferably from 75 to 85% by weight of at least one fluoropolymer (F), all the aforementioned percentages by weight being referred to the total weight of polymer alloy (PA).

To further improve the mechanical properties of the polymer alloy, various additives like fillers and plasticizers, such as organic esters, may be added to the polymer alloy of the present invention. Examples of the fillers are glass fibers, asbestos fibers, silica fibers, silica-alumina fibers, alumina fibers, zirconia fibers, potassium titanate whiskers, polyamide fibers, polyphenol fibers, silica, talc, clay, mica, calcium carbonate, barium sulfate, titanium oxide, silicon nitride and the like.

In a further object, the present invention provides a process for preparing the polymer alloy (PA) as above defined, said process comprising melt mixing the components of the polymer alloy.

Melt mixing is carried out at a temperature where all the components are in the molten form, thus at a temperature above the glass transition temperature or above the melting temperature of all the components.

In the melt mixing procedure, the aromatic polymer (A), the copolymer (C) and, optionally the at least one fluoropolymer (F) can be melted together, brought separately to their respective melting temperature and then mixed with each other, or subsequently added to a first melted polymer.

In a preferred embodiment according to the first object defined above, the melt mixing procedure is carried out by adding the copolymer (C) to the aromatic polymer (A) in the molten form.

In a preferred embodiment according to the second object defined above, the melt mixing procedure is carried out by adding the copolymer (C) to the aromatic polymer (A) in the molten form, mixing for few minutes, and then adding of the at least one fluoropolymer (F).

In a further preferred embodiment according to the second object defined above, copolymer (C) and at least one fluoropolymer (F) are added to the aromatic polymer (A) in the molten form.

The blend thus formed is allowed to stir for some minutes and allowed to cool to room temperature to provide the polymer alloy of the invention.

The polymer alloy of the present invention is preferably in the form of pellets.

The polymer alloy of the present invention has improved mechanical properties, in particular tensile properties, while maintaining the excellent properties of the parent polymers. Therefore, the polymer alloy of the present invention is suitably used in various fields including Automotive, Oil and Gas and Chemical Process Industry.

In a further object, therefore, the present invention provides an article comprising the polymer alloy as defined above. Preferably, the article according to the present invention can be a pipe or a piece of equipment formed by extrusion or molding technologies. Preferably, injection molding is used to obtain the wanted piece of equipment. Additionally, the articles of the present invention can be adhered to other articles by coextrusion or overmolding technologies.

Should the disclosure of any patents, patent applications, and publications which are incorporated herein by reference conflict with the description of the present application to the extent that it may render a term unclear, the present description shall take precedence.

The invention will be now described with reference to the following examples, whose purpose is merely illustrative and not intended to limit the scope of the invention.

EXPERIMENTAL PART

Raw Materials

PPS: Polyphenylene sulfide, commercially available as Ryton® from Solvay.

PSU: Polysulfone, commercially available as Udel® from Solvay.

PPSU: Polyphenylsulfone, commercially available as Radel® from Solvay.

PVDF: VDF homopolymer, commercially available as Solef® 6008 from Solvay.

VDF-co-CTFE: VDF copolymer comprising 9% by moles of CTFE recurring units.

FKM=vinylidene fluoride/hexafluoropropylene/tetrafluoroethylene terpolymer having 68.5% fluorine content.

As internal mixer in the following examples, a Brabender 50 EHT equipped with roller blades was used.

Measurement of Particle Size

The average particles size of the components of the polymer alloys of the examples was measured by SEM as the average over 100 particles obtained by analyzing pictures at about 1000× magnification.

Tensile Measurement

Tensile measurements were carried out according to ASTM D638 specimen type V.

Comparative Example 1

A blend of PPS and PVDF was prepared in an internal mixer at 310° C. using roller blades. About 53 grams of PPS were poured into the mixer and melted for 15 minutes at 30 rpm. Then, 18 gram of PVDF were added and mixed at 70 rpm for 15 min. Finally, the mixture was manually removed from the mixer, grinded in liquid nitrogen and subsequently compression molded in a 1 mm thick film for tensile and SEM analysis.

The SEM image of the blend obtained in Comparative Example 1 is shown in FIG. 1.

Example 1

A blend of PPS and VDF-co-CTFE was prepared in an internal mixer at 310° C. using roller blades. About 53 grams of PPS were poured into the mixer and melted for 15 minutes at 30 rpm. Then, 18 gram of VDF-co-CTFE were added and mixed at 70 rpm for 15 min. Finally, the mixture was manually removed from the mixer, grinded in liquid nitrogen and subsequently compression molded in a 1 mm thick film for tensile and SEM analysis.

Figure 2:
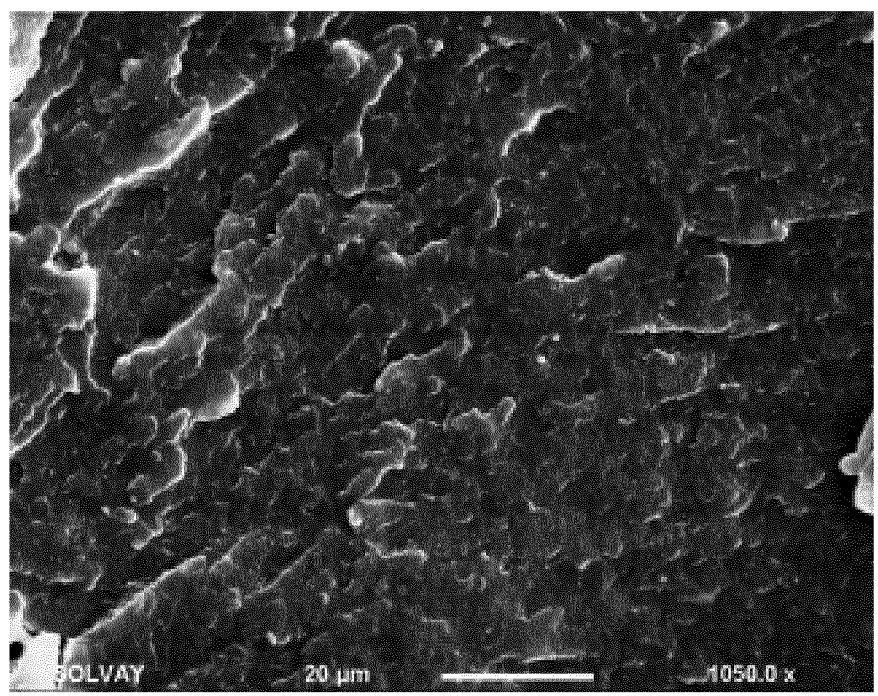
FIG. 2 shows the SEM image of the blend of Example 1 at a magnification of 1050.0×.

The SEM image of the blend obtained in Example 1 is shown in FIG. 2.

Example 1bis

A blend of PPS, PVDF and VDF-co-CTFE was prepared in an internal mixer at 310° C. using roller blades. About 51 grams of PPS were poured into the mixer and melted for 15 minutes at 30 rpm. Then, a powder mixture containing 17 gram of PVDF and 2 grams of VDF-co-CTFE were added and mixed at 70 rpm for 15 min. Finally, the mixture was manually removed from the mixer, grinded in liquid nitrogen and subsequently compression molded in a 1 mm thick film for tensile and SEM analysis.

Figure 3:
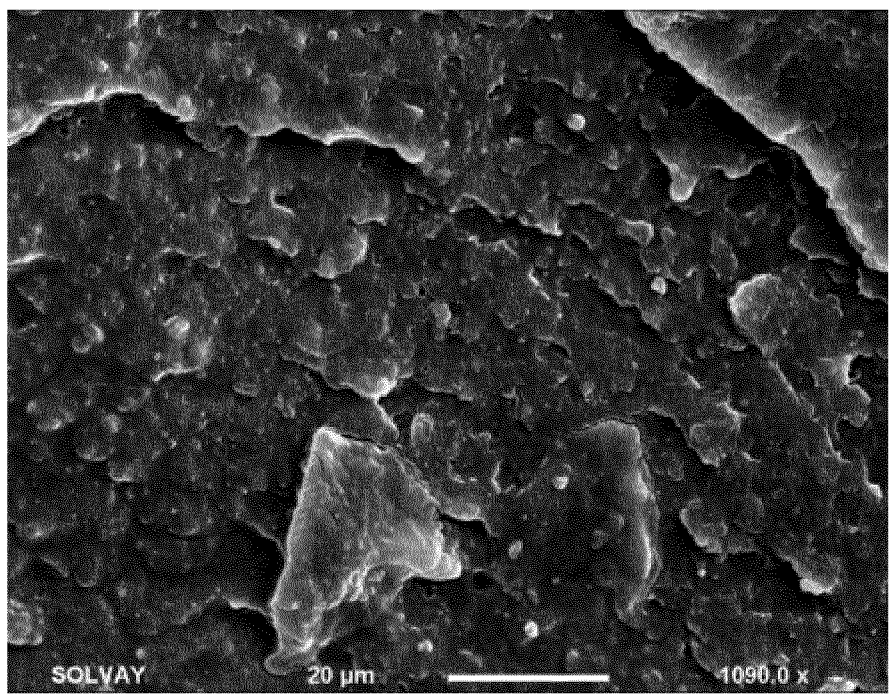
FIG. 3 shows the SEM image of the blend of Example 1 bis at a magnification of 1090.0× and at a magnification of 7960.0×.
Figure 3:
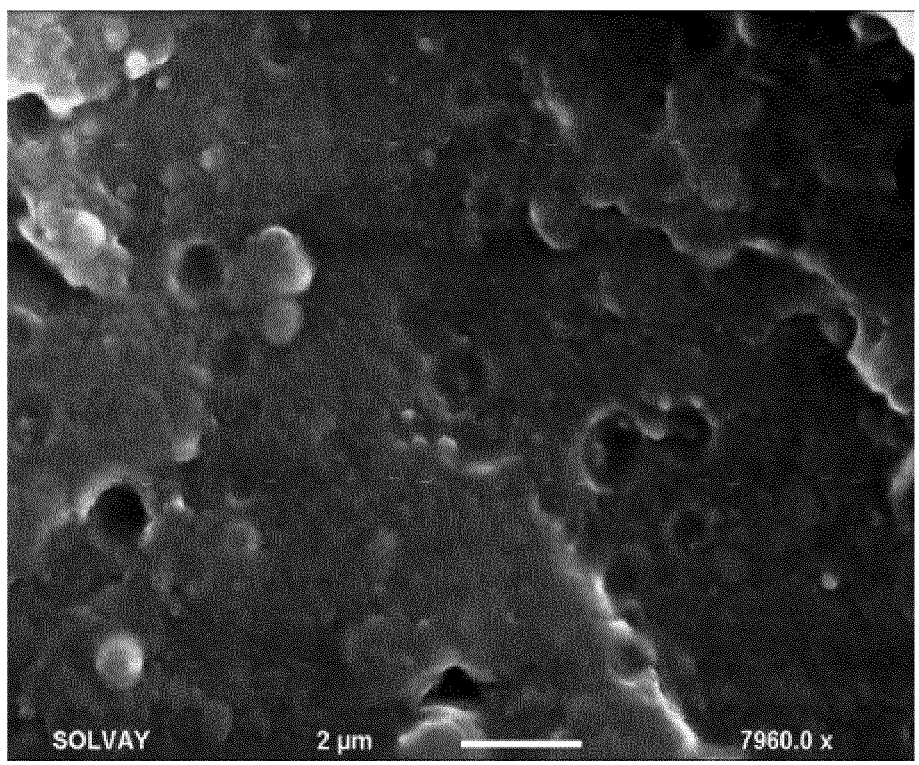

The SEM image of the blend obtained in Example 1 bis is shown in FIG. 3.

Comparative Example 2

A blend of PPS and FKM was prepared in an internal mixer at 310° C. using roller blades. About 53 grams of PPS were poured into the mixer and melted for 15 minutes at 30 rpm. Then, 18 gram of FKM were added and mixed at 70 rpm for 15 min. Finally, the mixture was manually removed from the mixer, grinded in liquid nitrogen and subsequently compression molded in a 1 mm thick film for tensile and SEM analysis.

Figure 4:
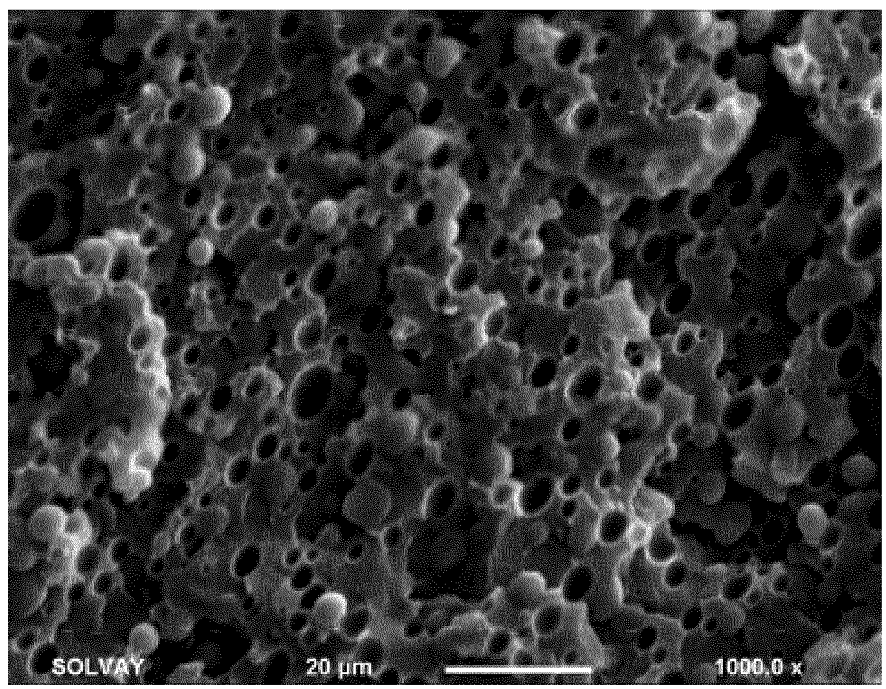
FIG. 4 shows the SEM image of the blend of Comparative Example 2 at a magnification of 1000.0×.

The SEM image of the blend obtained in Comparative Example 2 is shown in FIG. 4.

Example 2

A blend of PPS, FKM and VDF-co-CTFE was prepared in an internal mixer at 310° C. using roller blades. About 51 grams of PPS were poured into the mixer and melted for 15 minutes at 30 rpm. Then, a powder mixture containing 17 gram of FKM and 2 grams of VDF-co-CTFE were added and mixed at 70 rpm for 15 min. Finally, the mixture was manually removed from the mixer, grinded in liquid nitrogen and subsequently compression molded in a 1 mm thick film for tensile and SEM analysis.

Figure 5:
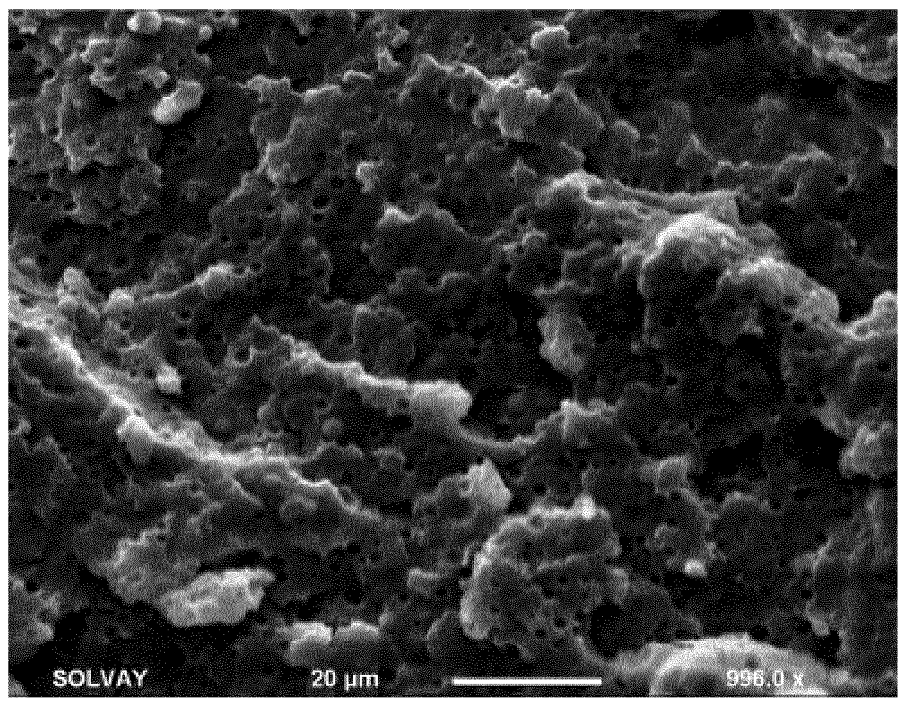
FIG. 5 shows the SEM image of the blend of Example 2 at a magnification of 996.0×.

The SEM image of the blend obtained in Example 2 is shown in FIG. 5.

Comparative Example 3

A blend of PSU and PVDF was prepared in an internal mixer at 310° C. using roller blades. About 53 grams of PSU were poured into the mixer and melted for 15 minutes at 30 rpm. Then, 18 gram of PVDF were added and mixed at 70 rpm for 15 min. Finally, the mixture was manually removed from the mixer, grinded in liquid nitrogen and subsequently compression molded in a 1 mm thick film for tensile and SEM analysis.

Figure 6:
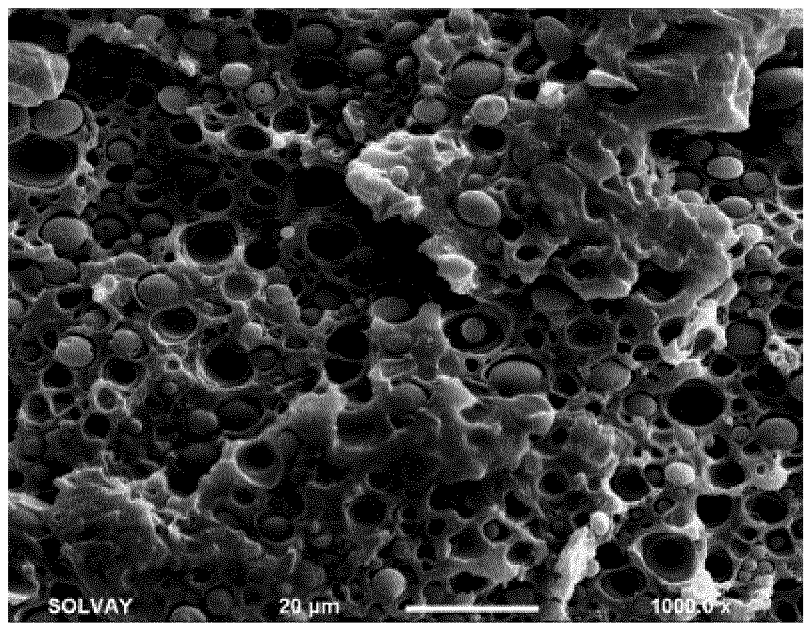
FIG. 6 shows the SEM image of the blend of Comparative Example 3 at a magnification of 1000.0×.

The SEM image of the blend obtained in Comparative Example 3 is shown in FIG. 6.

Example 3

A blend of PSU and VDF-co-CTFE was prepared in an internal mixer at 310° C. using roller blades. About 53 grams of PSU were poured into the mixer and melted for 15 minutes at 30 rpm. Then, 18 gram of VDF-co-CTFE were added and mixed at 70 rpm for 15 min. Finally, the mixture was manually removed from the mixer, grinded in liquid nitrogen and subsequently compression molded in a 1 mm thick film for tensile and SEM analysis.

Figure 7:
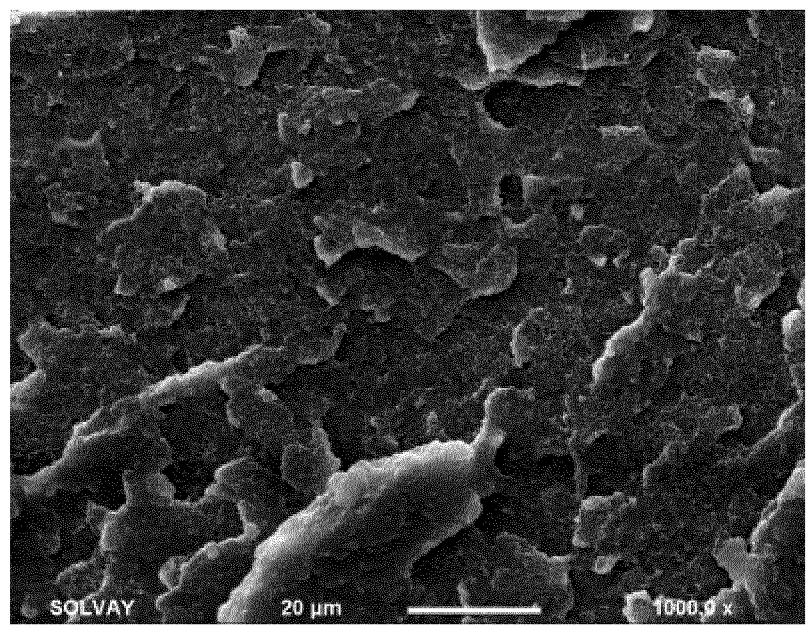
FIG. 7 shows the SEM image of the blend of Example 3 at a magnification of 1000.0×.

The SEM image of the blend obtained in Example 3 is shown in FIG. 7.

Comparative Example 4

A blend of PPSU and PVDF was prepared in an internal mixer at 310° C. using roller blades. About 53 grams of PPSU were poured into the mixer and melted for 15 minutes at 30 rpm. Then, 18 gram of PVDF were added and mixed at 70 rpm for 15 min. Finally, the mixture was manually removed from the mixer, grinded in liquid nitrogen and subsequently compression molded in a 1 mm thick film for tensile and SEM analysis.

Figure 8:
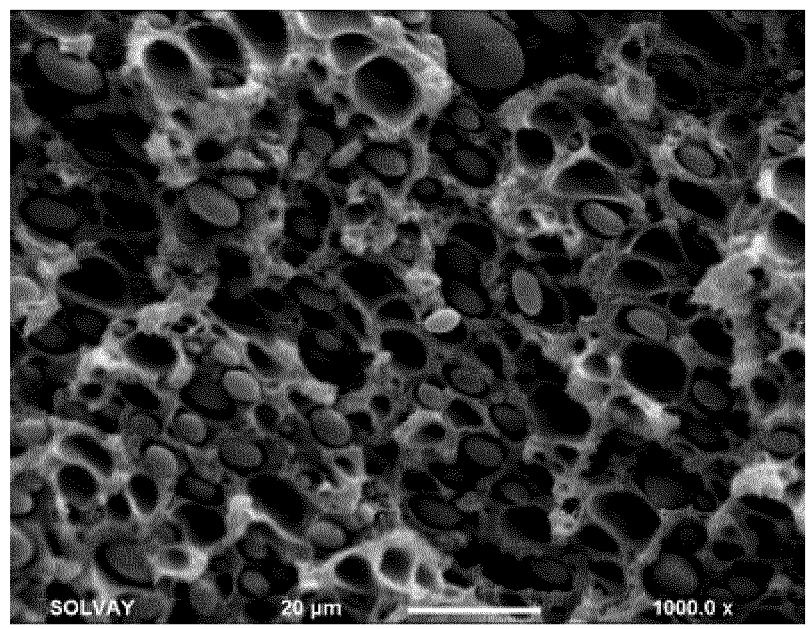
FIG. 8 shows the SEM image of the blend of Comparative Example 4 at a magnification of 1000.0×.

The SEM image of the blend obtained in Comparative Example 4 is shown in FIG. 8.

Example 4

A blend of PPSU and VDF-co-CTFE was prepared in an internal mixer at 310° C. using roller blades. About 53 grams of PPSU were poured into the mixer and melted for 15 minutes at 30 rpm. Then, 18 gram of VDF-co-CTFE were added and mixed at 70 rpm for 15 min. Finally, the mixture was manually removed from the mixer, grinded in liquid nitrogen and subsequently compression molded in a 1 mm thick film for tensile and SEM analysis.

Figure 9:
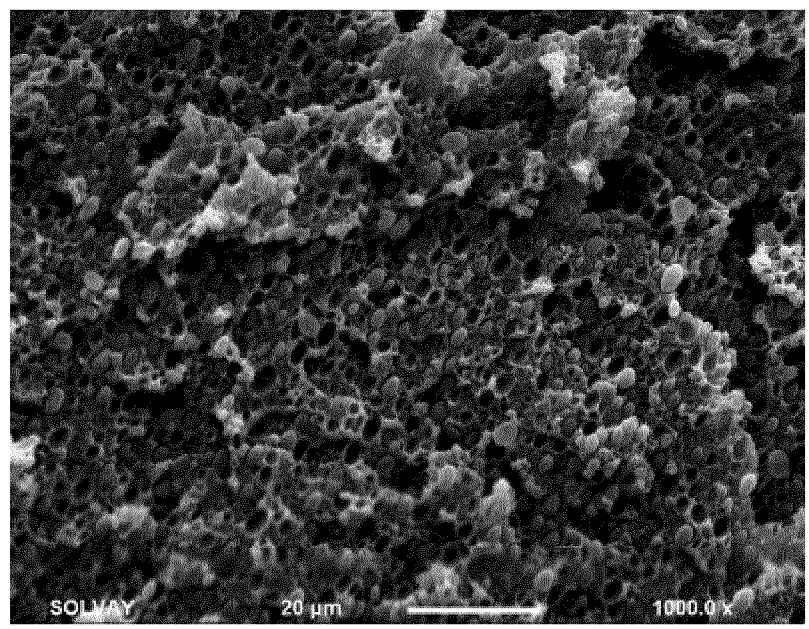
FIG. 9 shows the SEM image of the blend of Example 4 at a magnification of 1000.0×.

The SEM image of the blend obtained in Example 4 is shown in FIG. 9.

| Example | PPS parts | PSU parts | PPSU parts | PVDF parts | FKM parts | VDF-co-CTFE parts | Average Particle size (μm) | Elongation at break % |
| --- | --- | --- | --- | --- | --- | --- | --- | --- |
| Comp. 1 | 75 | — | — | 25 | | — | 5.8 | 10 |
| 1 | 75 | — | — | | | 25 | <0.2 | 24 |
| 1bis | 75 | — | — | 25 | | 3 | 0.4 | 24 |
| Comp. 2 | 75 | | | | 25 | 3 | 2.3 | |
| 2 | 75 | | | | 25 | 3 | 1.0 | |
| Comp. 3 | — | 75 | — | 25 | | — | 4.7 | 4 |
| 3 | — | 75 | — | — | | 25 | 0.7 | 26 |
| Comp. 4 | — | — | 75 | 25 | | — | 4.7 | 3 |
| 4 | — | — | 75 | — | | 25 | 1.4 | 50 |

The polymer alloy according to the present invention show a markedly reduced average particle size of the components in comparison with the alloy prepared in the absence of VDF-co-CTFE. This result demonstrates the effect of the VDF-co-CTFE copolymer in improving the compatibilization of fluoropolymers with sulphur-containing aromatic polymers.

The invention claimed is:

1. A polymer alloy (PA) comprising:

an aromatic polymer (A), which is a sulphur-containing aromatic polymer; and a copolymer (C), wherein copolymer (C) comprises:
- i) recurring units derived from vinylidene fluoride (VDF); and
- ii) from 0.5 to 20% by moles of recurring units derived from chlorotrifluoroethylene (CTFE), with respect to the total moles of recurring units of copolymer (C).

2. The polymer alloy according to claim 1 wherein the aromatic polymer (A) is a poly(arylene sulfide) (PAS) or an aromatic sulfone polymer (SP).

3. The polymer alloy (PA) according to claim 1 wherein copolymer (C) further comprises at least one fluorinated monomer (FM) different from VDF and from CTFE.

4. The polymer alloy according to claim 3 wherein copolymer (C) comprises:
- i) recurring units derived from VDF in an amount from 50 to 90% by moles with respect to the total moles of recurring units of copolymer (C);
- ii) recurring units derived from CTFE in an amount from 0.5 to 20% by moles with respect to the total moles of recurring units of copolymer (C); and
- iii) recurring units derived from a fluorinated monomer (FM) in an amount from 10 to 30% by moles with respect to the total moles of recurring units of copolymer (C).

5. The polymer alloy (PA) according to claim 1 which comprises:
- from 60 to 90% by weight of aromatic polymer (A); and
- from 10 to 40% by weight of copolymer (C),
- all the aforementioned percentages by weight being referred to the total weight of polymer alloy (PA).

6. The polymer alloy (PA) according to claim 1 which comprises:
- from 10 to 40% by weight of aromatic polymer (A); and
- from 60 to 90% by weight of copolymer (C),
- all the aforementioned percentages by weight being referred to the total weight of polymer alloy (PA).

7. A polymer alloy (PA) comprising:
- an aromatic polymer (A), which is a sulphur-containing aromatic polymer; and
- a copolymer (C), wherein copolymer (C) comprises:
  - i) recurring units derived from vinylidene fluoride (VDF);
  - ii) from 0.5 to 20% by moles of recurring units derived from chlorotrifluoroethylene (CTFE), with respect to the total moles of recurring units of copolymer (C); and
- at least one fluoropolymer (F), different from copolymer (C).

8. A polymer alloy (PA) according to claim 7 wherein the at least one fluoropolymer (F) is a polymer (VDF), which is a vinylidene fluoride polymer.

9. The polymer alloy according to claim 8, wherein the polymer (VDF) is selected from the group consisting of homopolymers of VDF, VDF/HFP copolymers or VDF/HFP/TFE terpolymers.

10. A polymer alloy (PA) according to claim 7 wherein the at least one fluoropolymer (F) is a polymer (F-TPE), which is a thermoplastic elastomer.

11. The polymer alloy (PA) according to claim 7 which comprises:
- from 60 to 90% by weight of aromatic polymer (A);
- from 0.1 to 10% by weight of copolymer (C); and
- from 9 to 39% by weight of at least one fluoropolymer (F),
- all the aforementioned percentages by weight being referred to the total weight of polymer alloy (PA).

12. The polymer alloy (PA) according to claim 7 which comprises:
- from 10 to 40% by weight of aromatic polymer (A);
- from 0.1 to 10% by weight of copolymer (C); and
- from 59 to 89% by weight of at least one fluoropolymer (F),
- all the aforementioned percentages by weight being referred to the total weight of polymer alloy (PA).

13. A process for preparing the polymer alloy (PA) according to claim 1, said process comprising melt mixing the aromatic polymer (A), the copolymer (C) and, optionally, the fluoropolymer (F).

14. An article comprising the polymer alloy according to claim 1.

15. The polymer alloy (PA) according to claim 1, wherein copolymer (C) comprises:
- i) recurring units derived from vinylidene fluoride (VDF); and
- ii) from 1 to 15% by moles of recurring units derived from chlorotrifluoroethylene (CTFE), with respect to the total moles of recurring units of copolymer (C).

16. The polymer alloy according to claim 2 wherein the aromatic polymer (A) is selected from polyphenylene sulfides (PPS), polysulfones (PSU) or polyphenylsulfones (PPSU).

17. The polymer alloy (PA) according to claim 5 which comprises:
- from 70 to 85% by weight of aromatic polymer (A); and
- from 20 to 30% by weight of copolymer (C),
- all the aforementioned percentages by weight being referred to the total weight of polymer alloy (PA).

18. The polymer alloy (PA) according to claim 6 which comprises:
- from 15 to 25% by weight of aromatic polymer (A); and
- from 75 to 85% by weight of copolymer (C),
- all the aforementioned percentages by weight being referred to the total weight of polymer alloy (PA).

19. The polymer alloy (PA) according to claim 11 which comprises:
- from 70 to 80%, by weight of aromatic polymer (A);
- from 1 to 5% by weight of copolymer (C); and
- from 20 to 30% by weight of at least one fluoropolymer (F),
- all the aforementioned percentages by weight being referred to the total weight of polymer alloy (PA).

20. The polymer alloy (PA) according to claim 12 which comprises:
- from 15 to 25% by weight of aromatic polymer (A);
- from 1 to 6% by weight of copolymer (C); and
- from 75 to 85% by weight of at least one fluoropolymer (F),
- all the aforementioned percentages by weight being referred to the total weight of polymer alloy (PA).

* * * * *